US005229601A

United States Patent [19]

Guern et al.

[11] Patent Number: 5,229,601

[45] Date of Patent: Jul. 20, 1993

[54] METHOD AND APPARATUS FOR SURVEILLANCE OF A DETERMINED SPACE SUCH AS A PORTION OF PREMISES, AN AREA OF GROUND, OR AN INDUSTRIAL INSTALLATION, FOR EXAMPLE

[75] Inventors: Yves Guern, Jouques; Gérard Pelous, Aix-en-Provence, both of France

[73] Assignee: Bertin & Cie, Plaisir, France

[21] Appl. No.: 847,721

[22] Filed: Mar. 5, 1992

[30] Foreign Application Priority Data

Mar. 7, 1991 [FR] France ............................... 91 02736

[51] Int. Cl.[5] ............................................... G01V 9/04

[52] U.S. Cl. ...................................... 250/221; 358/105

[58] Field of Search ............................. 250/221, 222.1; 340/555-557; 358/105

[56] References Cited

U.S. PATENT DOCUMENTS 4,912,770 3/1990 Seto et al. .......................... 358/105
4,922,093 5/1990 Fardeau et al. .................... 250/221
5,066,855 11/1991 Lee ...................................... 250/221
5,099,322 3/1992 Gove .................................... 358/105
5,099,324 3/1992 Abe ...................................... 358/105
5,153,719 10/1992 Ibenthal ............................. 358/105

FOREIGN PATENT DOCUMENTS 3615946 11/1987 Fed. Rep. of Germany .
2417222 9/1979 France .
2035007 6/1980 United Kingdom .

*Primary Examiner*—David C. Nelms
*Assistant Examiner*—S. Allen
*Attorney, Agent, or Firm*—Bell, Seltzer, Park & Gibson

[57] ABSTRACT

Method and apparatus for surveillance of a determined space in which a camera lens enables an image of said space to be formed on a set of photodetectors associated with information processing means, the set of photodetectors being a linear strip of photodetectors, for example, mounted so as to be fixed relative to the lens which is itself mounted to rotate about a transverse axis and which is displaceable by drive means to occupy predetermined angular positions about said axis.

20 Claims, 1 Drawing Sheet

METHOD AND APPARATUS FOR SURVEILLANCE OF A DETERMINED SPACE SUCH AS A PORTION OF PREMISES, AN AREA OF GROUND, OR AN INDUSTRIAL INSTALLATION, FOR EXAMPLE

The invention relates to a method and apparatus for surveillance of a determined space, such as a portion of premises, an area of ground, or an industrial installation, for example, making it possible to detect and determine reliably any presence or movement of people or moving bodies in said space.

It is already known to use a camera lens for forming an image of a space under surveillance on a matrix of unit photodetectors, in particular of the CCD type, which photodetectors are associated with driver and reader circuits connected via an analog-to-digital converter to an information processing system for analyzing the output signals from the unit photodetectors and for detecting any presence or movement in the space under surveillance.

Such matrices of photodetectors include high numbers of rows and columns of photodetectors (e.g. 512×512 or more), thus giving rise to a very large number of signals to be processed and analyzed. The processing and analysis system is then complex and expensive, particularly when it is necessary to obtain reliable information very quickly concerning any presence and any movement in the space under surveillance.

Proposals have been made to replace the matrix of unit photodetectors by a linear strip of photodetectors, comprising a single line of unit photodetectors, e.g. 1768 photodetectors, providing a quasi-linear image of the space under surveillance. The number of signals to be processed and analyzed is then much smaller (by a factor of about 100), thereby making it possible to simplify the circuits for processing and analysis and to reduce the time required for processing and analysis, but at the cost of losing of information since only that slice of the space under surveillance whose image is formed on the linear strip of photodetectors is examined.

An object of the invention is to provide a method and apparatus for surveillance of a determined space which enables the advantages of these two known techniques to be combined while avoiding their drawbacks.

To this end, the present invention provides a method of surveillance of a determined space such as a portion of premises, an area of ground, or an industrial installation, for example, the method consisting in forming an image of said space on a set of unit photodetectors by means of a camera lens, and in analyzing said image to detect any presence of movement in said space, the method being characterized in that quasi-linear images of the space under surveillance corresponding to mutually spaced-apart parallel slices through said space are formed on a line of unit photodetectors and are brought together so as to constitute a quasi-two-dimensional image of said space, which image is rendered discrete in a direction perpendicular to said line of unit photodetectors, which images are analyzed to obtain information concerning any presence or movement in said space.

The invention thus consists in analyzing not a complete image of the space under surveillance, but an image of said space that is quasi-two-dimensional and that is formed by bringing together a relatively small number of quasi-linear images of slices of the space under surveillance, thereby providing considerable savings in the processing of the output signals from the unit photodetectors while avoiding the risk of losing essential information.

In a first implementation of the invention, the set of unit photodetectors is a linear strip comprising a single line of photodetectors on which images of mutually spaced-apart parallel slices of the space under surveillance are formed sequentially.

The strip of photodetectors may be mounted so as to be fixed in the focal plane of the lens which is itself mounted to rotate about a transverse axis perpendicular to the axis of the lens and parallel to the strip, with the lens then being caused to rotate about said transverse axis to cause it to occupy predetermined angular positions in which the output signals of the photodetectors are read.

The invention then makes it possible to use a linear strip of unit photodetectors for rendering a two-dimensional image of the space under surveillance discrete in one direction and for obtaining quasi-linear images of high quality that are substantially free from distortion and/or aberrations.

In a variant, an optical component such as a plane mirror or a prism which is mounted to rotate about a stationary axis may be interposed between the lens and the space under surveillance or between the lens and the strip of photodetectors, said optical component being made to rotate about said stationary axis so that it takes up angular positions in which it reflects images of parallel slices of the space under surveillance onto the lens or onto the strip of photodetectors.

In yet another variant, the strip is displaceable stepwise in translation in a direction perpendicular to its longitudinal dimension and in the lens focal plane.

Advantageously, the displacement of the lens, of the strip, or of the optical component is periodic.

The maximum amplitude of said displacement is preferably modifiable so as to enable all of a determined space to be kept under surveillance or only a portion thereof, e.g. a portion in which some presence or movement has just been detected.

The size of the step used for rendering the two-dimensional image of the space under surveillance discrete is also modifiable, correspondingly.

In another implementation of the invention, set of photodetectors constitutes a matrix of photodetectors arranged in rows and in columns, a few rows of photodetectors are selected, and their output signals are taken to obtain said quasi-linear images of parallel slices through the space under surveillance.

In this implementation, none of the components of the system is a moving component, thereby eliminating causes of error and inaccuracy in the information obtained.

Results are thus obtained that are substantially equivalent to the results that have been obtained in the past with a matrix of photodetectors, but in a manner that is simpler, quicker, and cheaper.

The invention also provides apparatus for implementing the method, the apparatus comprising a set of unit photodetectors and a camera lens forming an image of the space under surveillance on the set of photodetectors, the apparatus being characterized in that the set of photodetectors is a linear strip comprising a single line of photodetectors, and in that a component constituted by said strip, or by the lens, or by an optical component such as a mirror or a prism is movable and is associated with drive means enabling it to be brought into predetermined positions in which quasi-linear images of spaced-apart parallel slices through the space under surveillance are formed successively on the strip of photodetectors.

The strip of photodetectors may be mounted so as to be fixed in the focal plane of the lens which is itself mounted to rotate about a transverse axis orthogonal to its optical axis and parallel to the strip of photodetectors, and which constitutes the moving component associated with the above-mentioned drive means.

Advantageously, the strip of photodetectors is glued to the mount of the lens and extends diametrically in the focal plane thereof.

In a variant, the lens carrying the strip of photodetectors is stationary and the above-mentioned optical component comprising a plane mirror or a prism is interposed between the lens and the space under surveillance or between the lens and the strip of photodetectors, and is mounted to rotate about a stationary axis.

In another variant, the strip of photodetectors is mounted to be movable stepwise in translation in the focal plane of the lens, said displacement preferably taking place in a direction perpendicular to the longitudinal direction of the strip.

The above-mentioned drive means may comprise at least one piezoelectric motor acting on the moving component, or else an electric motor whose outlet shaft carries a cam acting on said moving component. These drive means are associated with control means for causing the moving component to move periodically and stepwise, and enabling the step size to be adjusted, as well as enabling the total amplitude of said movement to be adjusted.

In another embodiment of the invention, the apparatus comprises a matrix of unit photodetectors disposed in rows and in columns, a camera lens forming an image of the space under surveillance on said matrix of photodetectors, circuits for reading the output signals of the photodetectors and for analog-to-digital conversion of said signals, and information processing means for analyzing the output signals from the photodetectors and for deducing any presence or movement in said space therefrom, the apparatus being characterized in that said information processing means are designed to select certain rows of photodetectors, to control the reading and acquisition of the output signals from the photodetectors of the selected rows, and to reconstitute a quasi-two-dimensional image of the space under surveillance from the quasi-linear images of said space provided by the output signals from the photodetectors in the selected rows.

This apparatus has the advantage of including no moving components or variable position components, and of making it simple to select different rows of photodetectors so as to obtain at will a quasi-two-dimensional image of the entire space under surveillance or of a portion only of said space.

In the following description given by way of example, reference is made to the accompanying drawing, in which.

Figure 1:
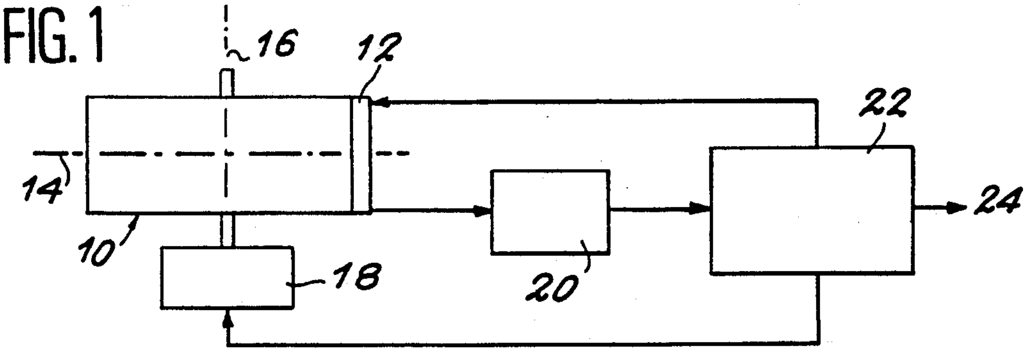
FIG. 1 is a block diagram of surveillance apparatus of the invention.

The apparatus of FIG. 1 essentially comprises a camera lens 10 of standard type, but preferably having very high image quality, which is associated in stationary manner with a linear strip 12 of CCD type unit photodetectors providing a set that is typically a few tens of millimeters long and having a dimension of the order of a few hundredths of a millimeter (in a plane perpendicular to the plane of the drawing) when the strip comprises 1768 unit photodetectors.

The strip 12 is situated on the optical axis 14 of the lens 10, with its long dimension being perpendicular to said axis, and it lies in the focal plane of the lens. In practice, the strip 12 is mounted on a suitable support which is itself fixed to the mount of the lens 10, advantageously by gluing.

The assembly comprising the lens 10 and the strip 12 of photodetectors is pivotal about a transverse axis 16 which is perpendicular to the optical axis 14 of the lens and parallel to the strip 12 which is horizontal in most cases. The axis 16 may be located at any point along the optical assembly, but it is preferably towards the middle thereof, and it may be coplanar with the optical axis 14, or otherwise.

Drive means 18 serve to rotate the lens 10 about the axis 16, preferably imparting movement that is stepwise and periodic, and having a determined maximum angular amplitude which may lie in the range a few degrees to a few tens of degrees or more, depending on circumstances.

The drive means 18 may be constituted by one or more piezoelectric motors enabling the angular displacement of the lens 10 to be defined with very great accuracy, or else they may comprise an electric motor, preferably a stepper motor, optionally associated with a cam acting on the angular position of the lens 10, which cam may have a profile that is continuous or stepped.

The photodetectors of the strip 12 are associated with driver and read circuits which are generally combined with the photodetectors to constitute a single integrated circuit. The read circuits are connected via an analog-to-digital converter 20 to information processing means 22 having one or more outputs 24 suitable for connection to indicator means, display means, alarm means, and/or for recording in a memory.

The information processing means 22 also control the read circuits of the photodetectors in the strip 12, and the drive means 18.

Figure 2:
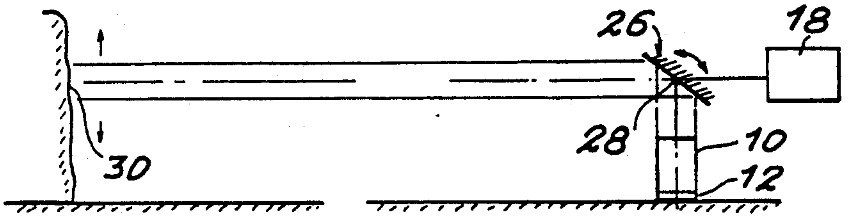
FIG. 2 shows a variant of the apparatus.

In the variant shown in FIG. 2, the lens 10 carrying the strip 12 of photodetectors is stationary and is associated with a plane mirror 26 mounted to rotate about a transverse axis 28 which is perpendicular to the optical axis of the lens 10 and which, in most cases, is horizontal. The plane mirror 26 reflects the image of a slice 30 of the space under surveillance along the optical axis of the lens. Rotation of the mirror 26 about the axis 28 under the control of drive means 18 of the same type as above, serves to form successive quasi-linear images of different slices of the space under surveillance on the strip 12 of photodetectors.

In another variant of the invention, the rotary mirror is disposed between the lens and the strip of photodetectors. The operating principle is the same as that described above.

In another variant of the invention, the plane mirror is replaced by a prism having plane reflecting faces, mounted to rotate about its axis of symmetry, and placed between the lens and the space under surveillance.

In yet another variant, the lens is stationary and the strip of photodetectors is displaceable stepwise in the focal plane of the lens by the drive means 18, with such displacement preferably taking place in a direction perpendicular to the longitudinal direction of the strip.

In another embodiment of the invention, the linear strip 12 of photodetectors of the embodiment shown in FIG. 1 is replaced by a matrix of photodetectors disposed in rows and in columns, said matrix being placed in the focal plane of the lens 10 which itself points in fixed manner towards the space under surveillance. The information processing means 22 are designed to enable certain rows of photodetectors to be prior selected so that the output signals therefrom are read and taken into account for detecting any presence or movement in the space under surveillance. The rows of photodetectors are identified by means of their sequence numbers in the matrix of photodetectors. It is very simple to begin by selecting certain rows of photodetectors so as to cover all of the space under surveillance, said rows being spaced apart at a relatively large pitch, and then as a function of the results obtained, to select other rows of photodetectors which are spaced apart at a smaller pitch so as to center detection and analysis on a portion only of the space under surveillance.

Figure 3:
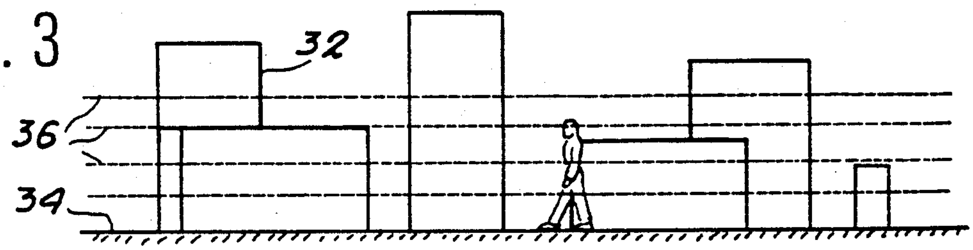
FIG. 3 is a diagram of a space under surveillance by the apparatus.

FIG. 3 is a diagram showing one example of how the apparatus of the invention can be applied.

The space under surveillance includes various objects 32 standing on the ground 34 and which may be constituted, for example, by pieces of furniture, machines, buildings, openings (doors, windows), terrain relief, etc., together with moving people or machines to be detected.

When this space is kept under surveillance by means of the apparatus of the invention (which, if constituted by the embodiment of FIG. 1 may occupy four predetermined angular positions about the pivot axis 16 of the lens 10, for example, or if constituted by the embodiment of FIG. 2 may have its mirror 26 occupy four determined angular positions about the axis 28), four linear images of the space are obtained in succession, which images correspond to four horizontal slices through the space as represented diagrammatically by dashed lines 36.

When the apparatus of the invention comprises a matrix of unit photodetectors placed in the focal plane of the lens 10 which points in stationary manner towards the space under surveillance, then these four quasi-linear images of the space under surveillance are obtained by selecting the corresponding four rows in the matrix of photodetectors.

Figure 4:
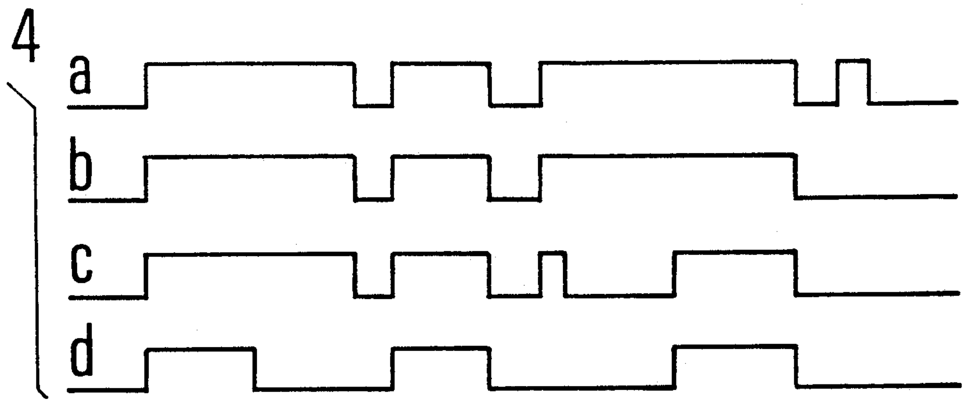
FIG. 4 is a highly diagrammatic representation of the appearance of linear images of said space as provided by apparatus of the invention.

The images formed by the output signals from the photodetectors and after shaping are represented diagrammatically at a, b, c, and d in FIG. 4, where curve a corresponds to the bottom slice, and curve d corresponds to the top slice.

Depending on circumstances, the linear images a, b, c, and d of the space under surveillance are either processed simultaneously in parallel by a plurality of processors, or else they are processed sequentially by a single processor.

In general, it is possible:

- to compare quasi-linear images corresponding to the same horizontal slice of the space under surveillance and taken at different instants, and to analyze the way their differences vary;
- to compare the quasi-linear images of two successive horizontal slices in the space under surveillance and to analyze the way their differences vary;
- to record the quasi-linear images at a frequency which is a submultiple of their read frequency and to compare successive images which are separated by a determined number of recorded images;
- to vary the frequency at which the quasi-linear images are recorded and/or the number of images between two images that are compared;
- to vary the frequency at which the photodetectors are read as a function of the brightness of the lighting in the space under surveillance so as to obtain a mean signal level which is substantially independent of lighting conditions;
- to bring together and combine information taken from analyses of the quasi-linear images so as to perform quasi-two-dimensional images of any presence or movement detected in the space under surveillance; and
- to compare a varying number of successive results to eliminate erroneous results such as may be due, for example, to a sudden change in lighting.

Figure 5:
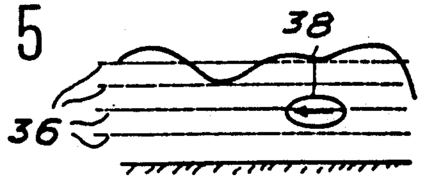
FIGS. 5 and 6 show two operating modes of the apparatus of the invention.
Figure 6:
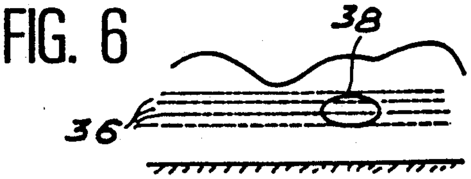

As shown diagrammatically in FIGS. 5 and 6, the invention also makes it possible to vary the pitch at which the image of the space under surveillance is rendered discrete so as to obtain more accurate information when any presence or movement is detected in said space.

In FIG. 5, the image of the space under surveillance is rendered discrete in the form of four quasi-linear images corresponding to dashed lines 36. The pitch between these lines is determined in such a manner as to be less than the corresponding dimension of a moving item to be detected, with the number of lines being a function of the height of the space under surveillance. When a moving item 38 is located, it is advantageous to reduce the pitch between the analysis lines in order to obtain analysis that is finer, the lines being centered on the located position of the moving item 38 as shown in FIG. 6. such finer analysis facilitates locating and identifying the moving item. This can be done merely by modifying the control signals applied to the drive means 18 when using a linear strip of photodetectors, or by changing the selected rows of photodetectors when using a matrix of photodetectors.

In general, without significantly increasing cost, the invention makes it possible to improve the quality and the reliability of information obtained by analyzing the signals provided either by a linear strip of photodetectors or by a few rows in a matrix of photodetectors, with an image of the space under surveillance being formed thereon, said space being possibly a portion of some premises, a building, a set of machines, an area of ground, etc., when the purpose of the invention is surveillance and the detection of intruders.

We claim:

1. A method of surveillance of a determined space such as a portion of premises, an area of ground, or an industrial installation, for example, the method consisting in forming an image of said space on a set of unit photodetectors by means of a camera lens, and in analyzing said image to detect any presence of movement in said space, the method being characterized in that quasi-linear images of the space under surveillance corresponding to mutually spaced-apart parallel slices through said space are formed on a line of unit photodetectors and are brought together so as to constitute a quasi-two-dimensional image of said space, which image is rendered discrete in a direction perpendicular to said line of unit photodetectors, which images are analyzed to obtain information concerning any presence or movement in said space.

2. A method according to claim 1, characterized in that the set of unit photodetectors is a linear strip comprising a single line of photodetectors on which images of mutually spaced-apart parallel slices of the space under surveillance are fromed sequentially.

3. A method according to claim 2, characterized in that it consists in mounting the strip of photodetectors so as to be fixed in a lens focal plane, in mounting the lens to rotate about a transverse axis perpendicular to the axis of the lens and parallel to the strip, and in rotating the lens about said said transverse axis to cause it to occupy predetermined angular positions in which signals are taken from the outputs of the photodetectors.

4. A method according to claim 2, characterized in that it consists in interposing an optical component such as a plane mirror or a prism mounted to rotate about a stationary axis between the lens and the space under surveillance or between the lens and the strip, and in rotating said optical component about the stationary axis to cause it to occupy angular positions in which it reflects images of parallel slices through the space under surveillance onto the lens or onto the strip.

5. A method according to claim 2, characterized in that the strip is displaceable stepwise in translation in a direction perpendicular to its longitudinal dimension and in the lens focal plane.

6. A method according to claim 1, characterized in that the displacement of the lens, of the strip, or of the optical component is periodic.

7. A method according to claim 6, characterized in that the maximum amplitude of the above-mentioned displacement and the pitch at which the two-dimensional image of the space under surveillance is rendered discrete are modifiable.

8. A method according to claim 1, characterized in that the set of photodetectors constitutes a matrix of photodetectors arranged in rows and in columns, and in that a few rows of photodetectors are selected and their output signals are taken to obtain said quasi-linear images of parallel slices through the space under surveillance.

9. A method according to claim 1, characterized in that the quasi-linear images of said space formed by the output signals of the photodetectors are analyzed simultaneously and in parallel to provide information on any presence or movement in said space.

10. A method according to claim 1, characterized in that the quasi-linear images of said space formed by the output signals of the photodetectors are analyzed sequentially to provide information on any presence or movement in said space.

11. A method according to claim 1, characterized in that the quasi-linear images of said space obtained for a given position at different instants are compared and the way their differences vary is analyzed.

12. A method according to claim 1, characterized in that the quasi-linear images of said space formed by the output signals of the photodetectors in two successive positions are compared and the way their differences vary are analyzed.

13. Apparatus for performing the method according to claim 1, the apparatus comprising a set of unit photodetectors and a camera lens forming an image of the space under surveillance on the set of photodetectors, the apparatus being characterized in that the set of photodetectors is a linear strip comprising a single line of photodetectors, and in that a component constituted by said strip, or by the lens, or by an optical component such as a mirror or a prism is movably mounted and is associated with drive means enabling it to be brought into predetermined positions in which quasi-linear images of spaced-apart parallel slices through the space under surveillance are formed successively on the strip of photodetectors.

14. Apparatus according to claim 13, characterized in that the strip of the photodetectors is mounted so as to be fixed in the focal plane of the lens which is itself mounted to rotate about a transverse axis orthogonal to its optical axis and parallel to the strip of photodetectors, and which constitutes the moving component associated with the above-mentioned drive means.

15. Apparatus according to claim 14, characterized in that the strip of photodetectors is glued to the mount of the lens and extends diametrically in the focal plane thereof.

16. Apparatus according to claim 13, characterized in that the above-mentioned moving component is a plane mirror or a prism interposed between the lens and the space under surveillance, or between the lens and the strip of photodetectors, and is mounted to rotate about a stationary axis.

17. Apparatus according to claim 13, characterized in that the drive means comprise at least one piezoelectric motor.

18. Apparatus according to claim 13, characterized in that the drive means comprise an electric motor whose outlet shaft carries a cam acting on the above-mentioned moving component.

19. Apparatus according to claim 13, characterized in that the drive means are associated with control means for imparting periodic displacement of adjustable amplitude to the above-mentioned optical component.

20. Apparatus for performing the method according to claim 1, the apparatus comprising a matrix of photodetectors organized in rows and in columns, a camera lens forming an image of the space under surveillance on said matrix of photodetectors, circuits for reading the output signals from the photodetectors and for performing analog-to-digital conversion of said signals, and information processing means for analyzing the output signals from the photodetectors and for deducing the presence or any movement in said space therefrom, the apparatus being characterized in that said information processing means are designed to select certain rows of photodetectors, to control the reading and acquisition of the output signals from the photodetectors of the selected rows, and to reconstitute a quasi-two-dimensional image of the space under surveillance from the quasi-linear images of said space provided by the output signals from the photodetectors in the selected rows.

* * * * *

UNITED STATES PATENT AND TRADEMARK OFFICE

CERTIFICATE OF CORRECTION

PATENT NO. : 5,229,601

DATED : July 20, 1993

INVENTOR(S) : Yves Guern et al.

It is certified that error appears in the above-identified patent and that said Letters Patent is hereby corrected as shown below:

Column 4, line 49, after "and/or" insert -- means --.

Column 6, line 45, "such" should be -- Such --.

Column 7, line 14, "fromed" should be -- formed --.

Signed and Sealed this

Twenty-ninth Day of March, 1994

Attest:

BRUCE LEHMAN

*Attesting Officer* *Commissioner of Patents and Trademarks*